Nov. 3, 1942.                R. FERGUSON                2,301,031
                                VALVE
                         Filed Oct. 5, 1939

Inventor
Reno Ferguson
By: [signature]
Attys.

Patented Nov. 3, 1942

2,301,031

UNITED STATES PATENT OFFICE 2,301,031

VALVE

Reno Ferguson, Chicago, Ill.

Application October 5, 1939, Serial No. 298,035

3 Claims. (Cl. 137—156.5)

The present invention relates to regulating valves adapted to control and maintain a certain pressure by supplying fluid as required from a source at a higher pressure.

The purpose of the present invention is to provide a valve of this character utilizing a bellows balanced between the higher pressure and a spring to control the pressure drop across the valve, and means in connection with the bellows adapted to free the valve from objectionable variations, due to the parts getting out of line or sticking in the valve cylinder.

The features and advantages of the present invention will appear more fully as the description proceeds, reference being had to the accompanying drawing wherein a preferred form of the invention is shown. It is to be understood, however, that the drawing and description are illustrative only and are not to be taken as limiting the invention except insofar as it is limited by the claims.

Figure 1:
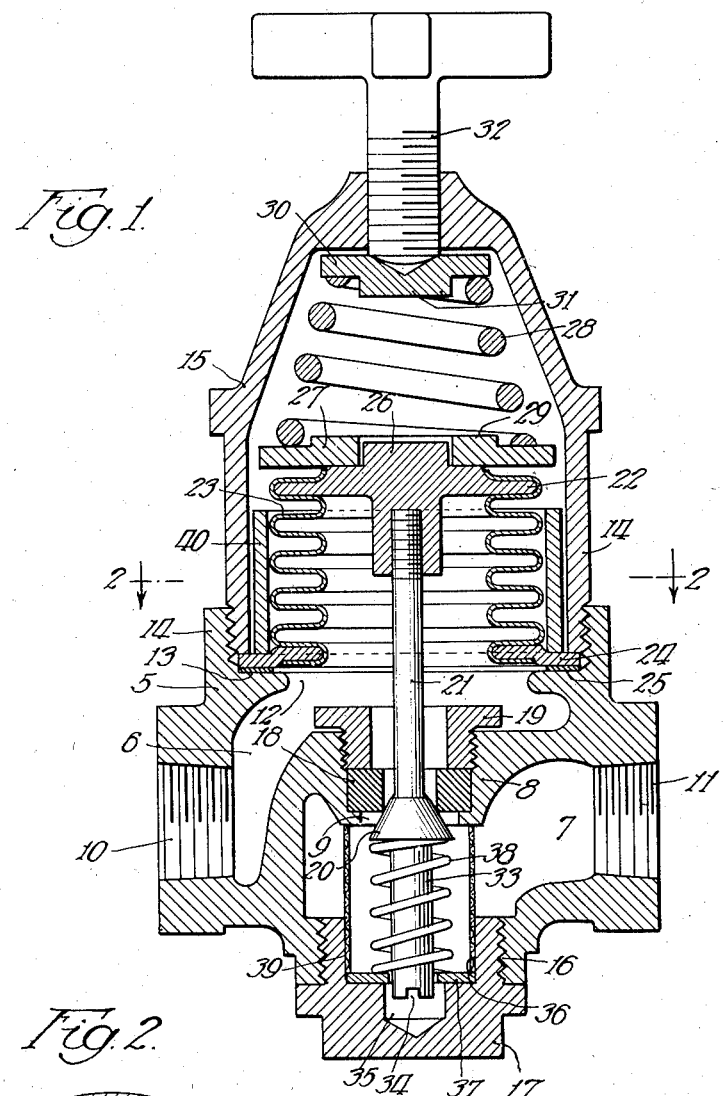
Fig. 1 is a sectional view through the valve.
Figure 2:
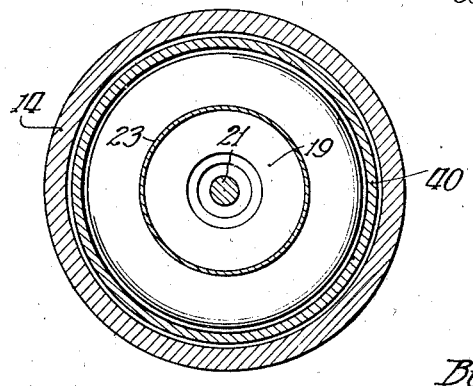
Fig. 2 is a sectional view taken on the line 2—2 of Fig. 1.

Referring now in detail to the drawing, the present invention is embodied in a valve comprising a cast body 5 having an inlet chamber 6 and an outlet chamber 7. The chambers 6 and 7 are divided by a partition 8 which is provided with a bore 9 connecting the two chambers. The valve body 5 is screw threaded at the inlet of the chamber 6 as indicated at 10 to receive the usual pipe fitting. Similarly, it is screw threaded at 11 for connection to an outlet pipe. The body 5 is also provided with an opening at 12 and a shoulder at 13. Around the shoulder 13 there is an internally screw threaded flange 14 which is adapted to receive a hollow cap 15. Thus the actual inlet chamber of the valve extends up into the cap 15.

Opposite the cap 15 the valve body 5 is provided with a screw threaded opening 16 which receives a cap 17.

The valve assembly comprises a valve seat 18 in the bore 9 and a seat retainer 19. The valve seat 18 may be of any suitable material for this purpose. A valve 20 is adapted to engage the seat 18. This valve has a stem 21 which extends upwardly into the inlet chamber 6 and is threaded into a head 22 of a bellows 23. The bellows 23 is made of thin sheet metal and is sealed to the head 22. It is also sealed at its open end to a ring 24 which is adapted to fit under the cap 15 and be clamped in place by the cap. A gasket 25 is provided beneath the ring 24. The head 22 has a bearing 26 for a ring 27 which is adapted to transmit spring pressure to the bellows 23. A spring 28 rides upon the ring 27 which is provided with a raised central portion 29 to keep the spring in place. At its upper end the spring receives a spring follower 30 having a depending portion 31 around which the spring seats. The spring follower is adapted to be pressed downwardly in the cap 15 by an adjusting screw 32.

The valve 20 has a stem portion 33 projecting downwardly into the outlet chamber 7 of the valve body. The stem portion 33 is slotted as indicated at 34 so that the valve can be adjusted with a screw driver when the cap 17 is removed. The cap 17 has a socket 35 receiving the end of the stem portion 33. The cap 17 also has a recess 36 in the bottom of which there is a washer 37. A spring 38 much smaller and weaker than the spring 28 is located between the valve 20 and the washer 37. A strainer 29 is also seated in the recess 36 and extends upwardly to engage the lower surface of the partition 8 around the bore 9.

In the use of the valve, the screw 32 is adjusted so that the valve will open the desired amount to maintain the requisite pressure in the outlet chamber 7. Normally, if the pressure in the outlet 7 drops, the bellows will collapse under the pressure of the spring 28 so as to quickly open the valve 20 and build up the pressure. If the pressure in the outlet builds up to slightly above normal pressure, then the balance between the interior pressure in the bellows 23 and the force of the spring 28 is overcome and the valve moves upwardly to closed position.

In devices of this character it is desirable to have the bellows 23 and the spring 28 free to act without binding, as any slight increase or decrease in friction will seriously affect the regulation of pressure in the outlet chamber. It will be noted that the parts throughout are free to move without binding on the walls of the valve body. However, if the spring 28 should not bear evenly downward upon the head 22, then it would also tend to tilt the parts out of line, which would impair the accuracy of the adjustment and cause the valve stem 21 to tilt because the bellows itself is flexible and may be distorted out of a straight line movement.

Means are provided whereby to prevent the parts from getting out of line. This means comprises a sleeve 40 surrounding the bellows 23 and loose within the cap 15. The sleeve, however, fits closely to the bellows and to the inner wall of the cap 15 so that if any tilting of the bellows appears the sleeve will tend to correct the tilting with a minimum of binding action. The sleeve is free to move within the cap 15 but the clearances are such that any tilting of the bellows will be prevented.

From the foregoing description it is believed that the construction and operation of the present invention will be readily apparent to those skilled in this art. Having thus described my invention, what I claim as new and desire to secure by Letters Patent is:

1. In regulating valve construction, in combination with a valve casing, a bellows mounted on the casing with its interior open to the interior of the casing, one end of the bellows being fixedly mounted with respect to the casing, a head on the other end of the bellows, a housing around said bellows and fixed to said casing, and a sleeve around the bellows shorter than the bellows and loosely mounted for movement endwise of the bellows within the housing, said sleeve fitting closely to the housing and to the bellows but being free to move lengthwise thereof whereby to oppose binding and tilting of the bellows in the housing.

2. In regulating valve construction, in combination with a valve casing, a bellows mounted on the casing with its interior open to the interior of the casing, one end of the bellows being fixedly mounted with respect to the casing, a head on the other end of the bellows, a housing around said bellows and fixed to said casing, a spring in the housing for applying pressure to the head of the bellows, a bearing member rotatable on the bellows head and serving to transmit the spring pressure to the bellows head, and a sleeve around the bellows shorter than the bellows and loosely mounted for movement endwise of the bellows within the housing, said sleeve fitting closely to the housing and to the bellows but being free to move lengthwise thereof whereby to oppose binding and tilting of the bellows in the housing.

3. In regulating valve construction, in combination with a valve casing, a bellows mounted on the casing with its interior open to the interior of the casing, one end of the bellows being fixedly mounted with respect to the casing, a head on the other end of the bellows, a housing around said bellows and fixed to said casing, a spring in the housing for applying pressure to the head of the bellows, a bearing member rotatable on the bellows head and serving to transmit the spring pressure to the bellows head, and a sleeve around the bellows shorter than the bellows and loosely mounted for movement endwise of the bellows within the housing, said sleeve fitting closely to the housing and to the bellows but being free to move lengthwise thereof whereby to oppose binding and tilting of the bellows in the housing, said bearing member being larger in diameter than the inner diameter of said sleeve whereby to limit endwise movement of the sleeve in the housing.

RENO FERGUSON.